United States Patent
Morovic et al.

(10) Patent No.: US 10,542,182 B2
(45) Date of Patent: Jan. 21, 2020

(54) COLOR SEPARATION

(71) Applicant: Hewlett-Packard Development Company, L.P., Houston, TX (US)

(72) Inventors: Peter Morovic, Sant Cugat del Valles (ES); Jan Morovic, Colchester (GB); Juan Manuel Garcia Reyero, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 14/906,051

(22) PCT Filed: Jul. 19, 2013

(86) PCT No.: PCT/EP2013/065269
§ 371 (c)(1),
(2) Date: Jan. 19, 2016

(87) PCT Pub. No.: WO2015/007334
PCT Pub. Date: Jan. 22, 2015

(65) Prior Publication Data
US 2016/0182763 A1    Jun. 23, 2016

(51) Int. Cl.
*H04N 1/60* (2006.01)
*H04N 1/52* (2006.01)

(52) U.S. Cl.
CPC ............ *H04N 1/52* (2013.01); *H04N 1/6019* (2013.01)

(58) Field of Classification Search
None
See application file for complete search history.

(56) References Cited

U.S. PATENT DOCUMENTS 5,410,617 A * 4/1995 Kidd .................. G06K 9/38
                                           358/466
5,553,199 A * 9/1996 Spaulding ............ H04N 1/6025
                                           358/1.9

(Continued)

FOREIGN PATENT DOCUMENTS

CN        101121344        2/2008
CN        102238297        11/2011
(Continued)

OTHER PUBLICATIONS

Elliot, Michael W., et al. "Print engine color management using customer image content." In Image Processing Workshop (WNYIPW), 2010 Western New York, pp. 38-41. IEEE, 2010.

(Continued)

*Primary Examiner* — Paul F Payer
(74) *Attorney, Agent, or Firm* — HP Inc. Patent Department

(57) ABSTRACT

Defining color separation for printing an image is disclosed. A color separation model is created. The model comprises a separation hypercube, wherein each axis of the separation hypercube represents a metric of the printing process and each vertex of the separation hypercube at each end of each axis represents the optimized separation of each metric. A weighting for at least one of the metrics represented by the created color separation model is determined. The determined weighting is applied to each of the vertices of the created color separation model to determine new vertices. A new color separation model based on the determined new vertices is created.

18 Claims, 4 Drawing Sheets

(56) References Cited

U.S. PATENT DOCUMENTS

| | | | | |
|---|---|---|---|---|
| 5,563,724 | A * | 10/1996 | Boll | H04N 1/6033 347/43 |
| 5,687,300 | A * | 11/1997 | Cooper | H04N 1/54 358/1.9 |
| 6,587,223 | B1 | 7/2003 | Yamaguchi | |
| 7,265,870 | B2 | 9/2007 | Velde et al. | |
| 7,408,673 | B1 * | 8/2008 | Chinn | G01J 3/02 345/593 |
| 8,149,456 | B2 | 4/2012 | Fan et al. | |
| 8,213,055 | B2 * | 7/2012 | Morovic | H04N 1/6016 358/2.1 |
| 8,363,273 | B2 | 1/2013 | Morovic et al. | |
| 8,649,063 | B2 * | 2/2014 | Park | H04N 1/0035 345/418 |
| 8,873,102 | B2 * | 10/2014 | Nielsen | H04N 1/56 358/1.13 |
| 2003/0072022 | A1 * | 4/2003 | Someno | B41J 2/1752 358/1.13 |
| 2007/0095235 | A1 | 5/2007 | Nielsen et al. | |
| 2011/0096344 | A1 * | 4/2011 | Morovic | H04N 1/6033 358/1.9 |
| 2011/0096365 | A1 * | 4/2011 | Benedicto | H04N 1/6033 358/3.06 |
| 2015/0373229 | A1 * | 12/2015 | Morovic | B41J 2/17546 358/1.9 |
| 2016/0080608 | A1 * | 3/2016 | Morovic | H04N 1/6025 358/3.23 |
| 2016/0080612 | A1 * | 3/2016 | Martinez de Salinas Vazquez | G06K 15/1878 358/3.06 |

FOREIGN PATENT DOCUMENTS

| | | |
|---|---|---|
| EP | 1887788 | 2/2008 |
| WO | WO-2013008245 | 1/2013 |

OTHER PUBLICATIONS

Morovic, J. et al. "HANS: Controlling Ink-Jet Print Attributes Via Neugebauer Primary Area Coverages", IEEE Transactions on Image Processing, IEEE Service Center, Piscataway, NJ, US, vol. 21, No. 2, Feb. 1, 2012, pp. 688-698.

PCT International Search Report and Written Opinion, dated Apr. 10, 2014, PCT Application No. PCT/EP2013/065269, European Patent Office, 12 pages.

* cited by examiner

COLOR SEPARATION

CROSS-REFERENCE TO RELATED APPLICATION

This application is a U.S. National Stage Application of and claims priority to International Patent Application No. PCT/EP2013/065269, filed on Jul. 19, 2013, and entitled "COLOR SEPARATION," which is hereby incorporated by reference in its entirety.

BACKGROUND

One technique for reproducing a desired target color using a printing system is a color separation process. Color separation has traditionally been a matter of deciding what quantities of each of several inks (or other colorants) to use to achieve a given color. Setting up an end-to-end color pipeline involves defining the color separation which may be a complex and time consuming process.

BRIEF DESCRIPTION OF DRAWINGS

For a more complete understanding, reference is now made to the following description taken in conjunction with the accompanying drawings in which.

DETAILED DESCRIPTION

Figure 1:
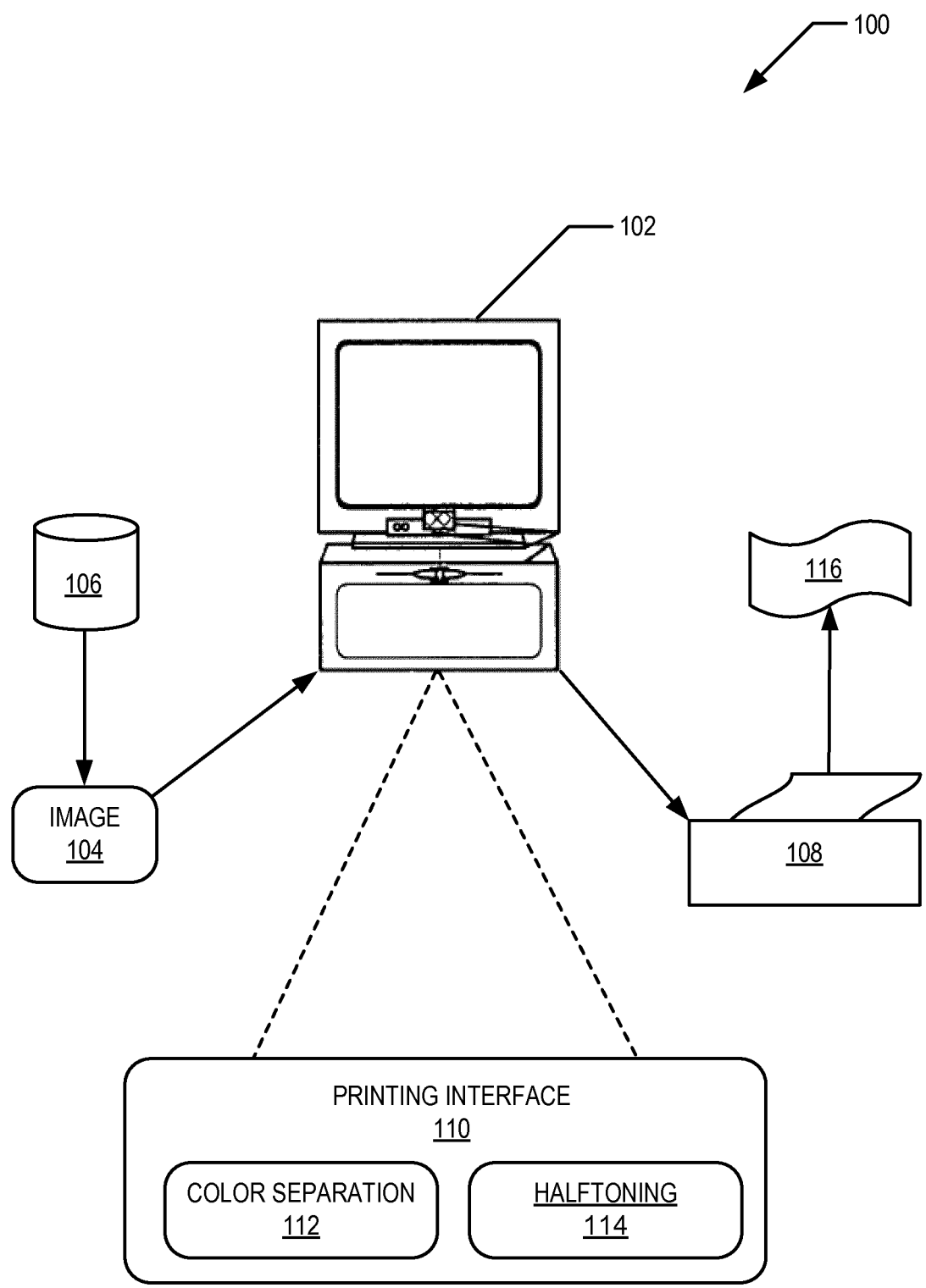
FIG. 1 is a simplified schematic of an example of a printing system.

This disclosure describes various exemplary methods and computer products for defining a color separation for printing an image on a printing system. In particular, a method of dynamically and freely selecting color pipeline properties based on a series of pre-computed separations and their linear, convex combination into a new color separation that is a weighted average based on the chosen properties and their relative importance.

One technique of color separation chooses a Neugebauer Primary area coverage (NPac) vector, including up to all of an ink set's $k^n$ Neugebauer primaries (NPs), followed by a halftoning process to generate the corresponding halftone patterns based upon the Neugebauer Primary area coverages. In one implementation, the Neugebauer Primaries are all the possible combinations of a set of n inks.

Each ink within the set may be at one of k levels for a single halftone pixel, where there are $k^n$ combinations for each ink set defining all of the possible ink configuration states that a single pixel can have. For example, where k=2 for a binary (or bi-level) printer, the printer is able to use either no ink or one drop of ink at a single pixel per ink channel. Given that NPacs represent linear, convex combinations of NPs (with relative area coverages being the convex weights), and as all of a printing system's NPacs are accessible, all colors inside the convex hull of a printing system's Neugebauer primaries' colors can be addressed.

Setting up an end-to-end color pipeline, which involves defining a color separation may be based on a Halftone Area Neugebauer Separation (HANS) pipeline or the like that has the property of being linearly combinable, so that, for example, a color separation model that may be created node-by-node by combining part of the ink-use-maximizing and part of the ink-use-minimizing separation nodes results in a new color separation model and hence a new pipeline whose overall ink-use is part-way between the most and least ink-using color separations. This is a consequence of HANS being linear with area coverage of Neugebauer Primaries in a well chosen color space such as Yule-Nielsen-corrected XYZ and enables instantaneous pipeline choices either based on writing system feedback (e.g. favor certain inks over others, etc.) or user choice (e.g. use as much black ink as and wherever possible, etc.).

When designing color pipelines a number of constraints and design choices need to be taken into account including overall as well as per-ink or local ink-use, grain and other image-quality-affecting properties etc. The relative importance of these depends on both customer preferences and intrinsic platform constraints or even the actual state of a printing system. Some of these can be decided off-line, while others have to be dynamic, including allowing user choice. For example, it may be desirable to dynamically adjust individual ink-channels involved in the pipeline should artifacts relate to only some of them (for example, try to minimize the use of a light Magenta ink and compensate by pattern choices that use the remaining inks). Examples of user-chosen properties instead could be trading-off between ink-use and image quality, the amount of black ink used in the pipeline for line quality, overall or local ink coverage (for drying, gloss uniformity, . . . ) etc. The exemplary method enables a free, continuous choice of any combination of constraints and choices within this multi-dimensional domain.

The ability to dynamically recompute color separations in real-time with a combined set of characteristics is difficult due to the absence of a domain within which such recomputation would be possible with predictable and accurate results. Partial solutions address some aspects, such as recomputing International Color Consortium (ICC) profiles from the same measurements based on Gray Component Replacement (GCR) (black use) choices or a multi-node snap-to-choice between a series of precomputed separations (for example, X separations are computed based on a some criterion and the user/system has then X choices).

Another solution is to statically pre-compute certain combinations of characteristics and then to select only among such a discrete set of separations. This has a clear disadvantage of requiring either the storage of a large (and sometimes hard to anticipate) number of separations with their specific design choices, or the use of only few alternative states, which is likely to be too crude in practice.

FIG. 1 illustrates an exemplary printing system and image processing 100. Printing system 100 can be implemented, at least in part, by one or more suitable computing devices, such as computing device 102. Other computing devices that may be used include, but are not limited to, a personal computer, a laptop computer, a desktop computer, a digital camera, a personal digital assistance device, a cellular phone, a video player, and other types of image sources.

In one implementation, an image 104 is uploaded to the computing device 102 using input device 106. In other implementations, the image may be retrieved from a previously generated image set contained on a storage media, or retrieved from a remote storage location, such as an online application, using the Internet. Image 104 may be a still digital image created by a digital camera, a scanner, or the like. In other implementations the image may be a moving image such as a digital video. Image 104 may be sent to an output device such as printing device 108 by the computing device 102. Other printing devices that may be used include, but are not limited to, a dot-matrix printer, an inkjet printer, a laser printer, line printer, a solid ink printer, and other digital printers. In other implementations, the image may be displayed to a user on an output device 108 including, but not limited to, a TV set of various technologies (Cathode Ray Tube, Liquid Crystal Display, plasma), a computer display, a mobile phone display, a video projector, a multi-color Light Emitting Diode display, and the like.

In one implementation, printing system 100 employs a printing interface and image processing system 110 referred to as Halftone Area Neugebauer Separation (HANS). HANS may be executed using computing device 102. However, in other implementations, HANS may be executed using the printing device 108.

HANS changes the space in which a color separation process 112 and a halftoning process 114 communicate. In one example of a separation performed using HANS, the channels connecting the color separation process and the halftoning process communicate using aspects associated with Neugebauer Primary Area Coverage (NPac). In one implementation, the NPacs utilize a set of equations referred to as the Neugebauer equations. Neugebauer equations are tools for characterizing color printing systems based upon halftoning techniques. The Neugebauer equations, are associated with colors referred to as the Neugebauer Primaries, which in a binary (bi-level) printing device, are the $2^n$ combination of n inks, wherein the application of each of the n inks is at either 0% or 100% within an n-dimensional ink space. Generally, the number of Neugebauer Primaries (NPs) is $k^n$, where k is the number of levels at which an ink can be used and n is the number of inks. For example, for a printer comprising six different inks either 0, 1, or 2 drops of each ink may be specified at each halftone pixel, resulting in $3^6$ or 729 Neugebauer Primaries (NPs).

The printing device 108 will direct the image 104 to be printed upon a substrate 116 as dictated by the HANS printing process. The substrate 116 may include, without limitation, any variety of paper (lightweight, heavyweight, coated, uncoated, paperboard, cardboard, etc.), films, foils, textiles, fabrics, or plastics.

It should be noted that while printing system 100 is described in the context of image processing in a computing environment, it is to be appreciated and understood that it can be employed in other contexts and environments involving other types of data processing without departing from the spirit and scope of the claimed subject matter.

Color printing is the reproduction of an image or text in color on substrate 116. A technique which may be used to print full-color images, such as photographs, is a four-color process printing. In one implementation, a four-color printing process includes three primary color inks and the color black (K). The primary ink colors include, but are not limited to, cyan (C), magenta (M), and yellow (Y). This four-color process, referred to as CMYK, is a subtractive process.

As discussed above, the printing interface 110 implements two main processes, the first of which is color separation. Color separation involves representing a color image as a combination of several single-color images corresponding to available ink colors, or printable elementary colors, in a printing system. In one example, the color image is represented as a combination on or more single-color layers.

Figure 2:
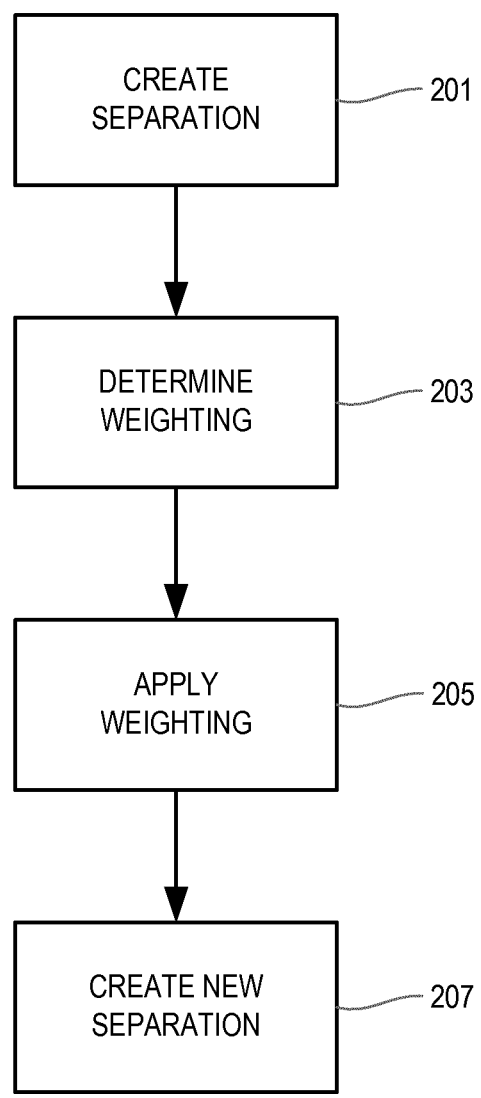
FIG. 2 is a flowchart of an example of a method of defining color separation for printing.
Figure 3:
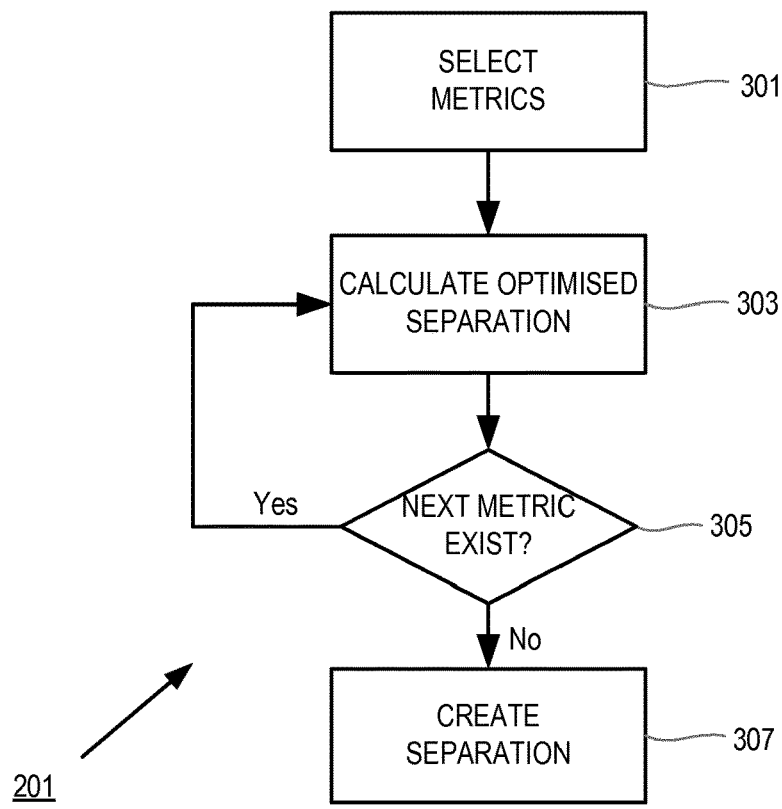
FIG. 3 is a flowchart of more detail of the example of offline part of defining color separation for printing.
Figure 4:
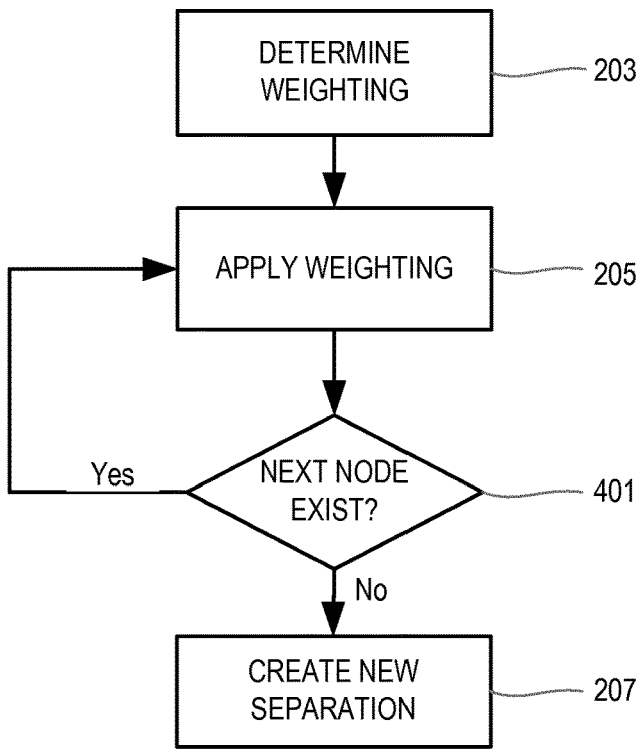
FIG. 4 is a flowchart of more detail of the example of online part of defining color separation for printing.

With reference to FIGS. 2 to 4, a HANS based pipeline where a series of separations at the extremes of all choice-axes may be precomputed and subsequently combined into new color separations that have properties depending on the respective weights of each individual separation. For example the separation that uses most black and one that uses least, a separation that uses no light Cyan and one that uses it as much as possible, one that uses as little ink as possible and one that uses as much as possible etc. can be pre-computed and then new separations are created on the fly on a continuum in a multi-dimensional hypercube. The weighting of the individual nodes of the hypercube may depend on design constraints or user choices or current device states (for example, failing pens, missing nozzles etc).

Firstly a color separation model is created, 201. The model comprises a separation hypercube, wherein each axis of the separation hypercube represents a metric of the printing process and each vertex of the separation hypercube at each end of each axis representing the optimized separation of each metric. Next a weighting for at least one of the metrics represented by the created color separation model is determined, 203. The determined weighting is applied to each of the vertices of the created color separation model to determine new vertices, 205. A new color separation model based on the determined new vertices is then created, 207.

The process would consist of two elements, an off-line part, shown in FIG. 3, and an on-line part, shown in FIG. 4.

With reference to FIG. 3, the offline process comprises precomputing the color separation model 201. This comprises selecting, 301, the metrics (the choice-axes) that are needed and/or relevant for the particular printer in use, for example, ink-use, ink-flux, grain, color constancy, black-ink-use, other individual ink-uses, etc. A HANS optimized separation (as outlined for example by US 20110096344) for each of the individual metrics is calculated, 303, 305 by both maximizing the metrics and minimizing them, these are the end-points of the axes of the hypercube, i.e. the vertices of the separation domain hypercube. The result is a separation model that comprises a multi-dimensional hypercube with axes representing one metric at a time (e.g. one axis will be overall ink-use, another one color constancy, another one grain etc.), 307.

With reference to FIG. 4, the on-line part of the process ("on-the-fly" part of the process) is illustrated. The process comprises determining, 203, a weighting of at least one of the selected metrics. This may comprise composing a weighting vector for an individual metric—based on design constraints, user choices or current device state feedback, for example. The weighting vectors may be derived, for example, in response to data obtained from the printing device, for example, for a large number of malfunctioning nozzles of magenta, a separation would be composed from pre-computed separations that minimize the use of that ink, or derived, for example, based on user input, for example, if grain is twice as important as ink use efficiency, the grain minimizing separation would be given a weighting of ⅔ while the ink use minimizing one would have a weighting of ⅓. The weighting vector is applied, 205, 401, to the individually optimized separations on each of the vertices of the hypercube on a node-by-node basis to create, 207, a new color separation.

The ability to do this is enabled by providing linear control in a well chosen space such as Yule Nielsen XYZ ($XYZ^{1/N}$) and because of the node-by-node averaging occurring in area coverage space. Two nodes in two different color separations that have different NPacs, one that uses most ink and one that uses least ink, can be convexly (linearly with weights between [0 1] and summing to one) combined with the metric also resulting in the linear average—e.g. if a separation is desired that is not at the minimum of ink-use but 20% off (e.g. for better coverage uniformity) then this separation is computed as [0.8×ink-minimizing-separation+ 0.2×ink-maximizing-separation]. Since this is a simple per-node convex averaging operation it can be considered real-time and can be used also in user-exposed contexts such as a user changing the black-ink use strategy just before printing. This example simply exposes a black generation option in spite of an RGB interface (when traditionally it is only available when driving pipelines with a CMYK interface since this is significantly easier to do).

As a result, the system described above has the ability to have native GCR control in an RGB driven pipeline (instead of CMYK where it is common and natural). This is a key requirement of using RGB pipelines in commercial and industrial printing, which has other benefits besides those directly derived from the system (for example, economies of scale with consumer printing assets, data transfer and storage savings, and throughput gains).

It also has the ability to give user pipeline choices such as ink-use vs IQ 'slider', individual ink 'sliders'. An IQ 'slider' allows for a choice of ink use versus image quality on a continuum from printed output being most ink use efficient to it having highest image quality.

Figure 5:
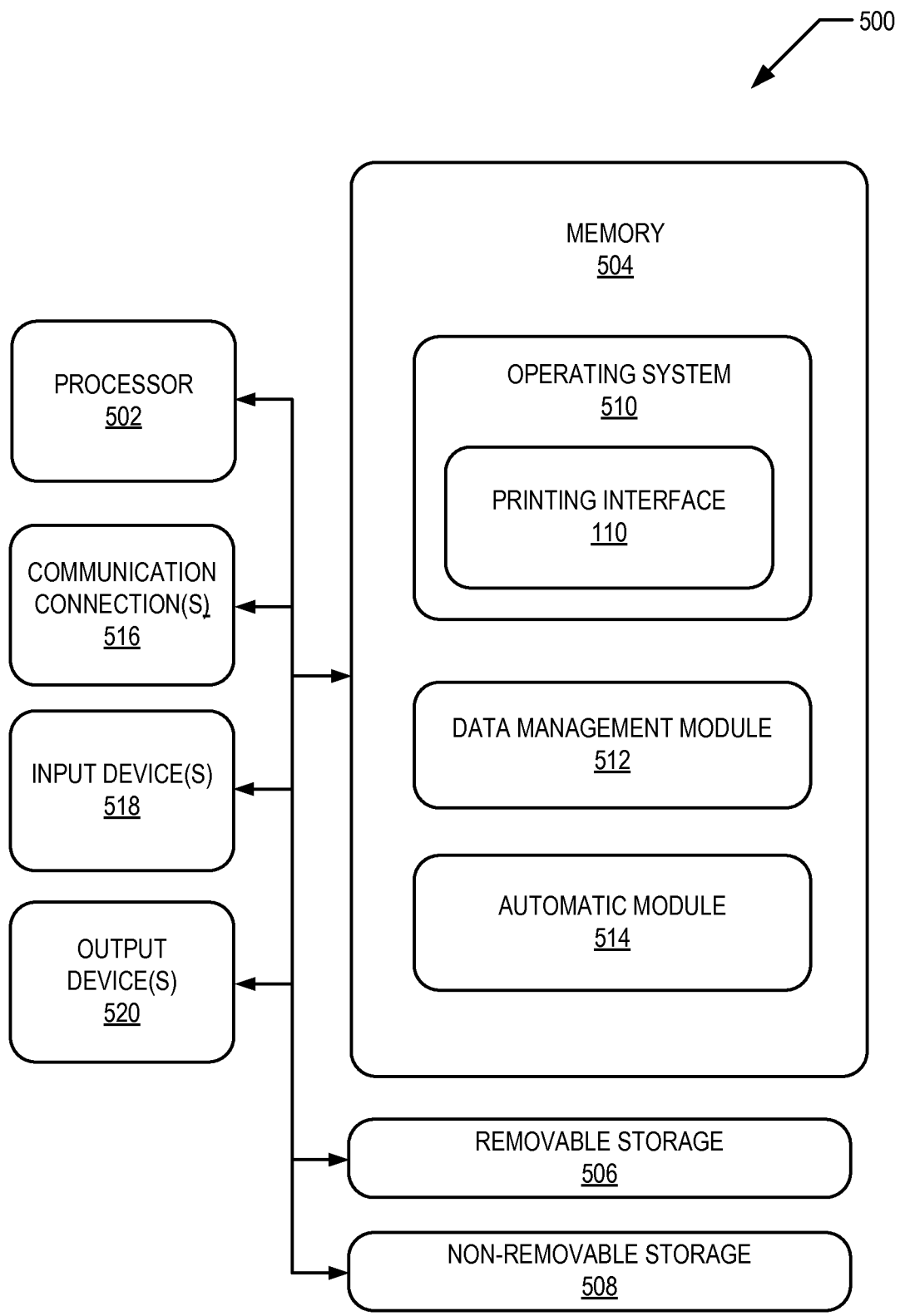
FIG. 5 is an example of a computer environment of the printing system of FIG. 1.

Further, real time recomputation of color separations is provided without the need for per-attribute optimization when requirements or device conditions change FIG. 5 is a schematic block diagram of an exemplary general operating system 500. The system 500 may be configured as any suitable system capable of implementing interactive user interface 110 and associated color processes. In one exemplary configuration, the system comprises at least one processor 502 and a memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The system may also include additional removable storage 506 and/or non-removable storage 508 including, but not limited to, magnetic storage, optical disks, and/or tape storage. The disk drives and their associated computer-readable medium may provide non-volatile storage of computer readable instructions, data structures, program modules, and other data for the communication devices.

Memory 504, removable storage 506, and non-removable storage 508 are all examples of the computer storage medium. Additional types of computer storage medium that may be present include, but are not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the computing device 102.

Turning to the contents of the memory 504 in more detail, may include an operating system 510 printing interface 110.

For example, the system 500 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 504 includes the printing interface 110a data management module 512, and an automatic module 514. The data management module 512 stores and manages storage of information, such as images, ROI, equations, and the like, and may communicate with one or more local and/or remote databases or services. The automatic module 514 allows the process to operate without human intervention.

The system 500 may also contain communications connection(s) 516 that allow processor 502 to communicate with servers, the user terminals, and/or other devices on a network. Communications connection(s) 516 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 500 may also include input device(s) 518 such as a keyboard, mouse, pen, voice input device, touch input device, etc., and output device(s) 520, such as a display, speakers, printer, etc. The system 500 may include a database hosted on the processor 502. All these devices are well known in the art and need not be discussed at length here.

While the method and computer products have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. The features of any dependent claim may be combined with the features of any of the independent claims or other dependent claims.

The invention claimed is:

1. A method of defining color separation for printing an image, the method comprising:
   creating a color separation model, the model comprising a separation hypercube, wherein each axis of the separation hypercube represents a metric of a printing process and each vertex of the separation hypercube at each end of each axis represents the optimized separation of each metric, the color separation model created offline prior to performing the printing process;
   determining a weighting for a metric represented by the created color separation model; and
   applying the determined weighting to each of the vertices of the created color separation model to create a new color separation model;
   directing an image to be printed as dictated by the new color separation model,
   wherein determining the weighting and applying the determined weighting to create the new color separation model are performed online during the printing process.

2. The method of claim 1, wherein the metric is one of a plurality of metrics, and creating a color separation model comprises:

selecting a subset of the metrics defining a characteristic of the printing process; and calculating an optimized separation for each of the selected metrics to define each vertex of the color separation model.

3. The method of claim 1, wherein the metric is one of a plurality of metrics, and determining a weighting comprises:

determining a weighting vector for at least one of the metrics based on design constraints, user preferences and/or current device state feedback.

4. The method of claim 1, wherein the metric is a first metric, and applying the determined weighting comprises combining the first metric and a second metric in a linear average.

5. The method of claim 1, wherein creating a color separation model comprises creating the color separation model using NPacs.

6. The method of claim 1, comprising:

setting up an end-to-end color pipeline involving defining the color separation based on the new color separation model.

7. A method of printing an image, the method comprising:

receiving a plurality of metrics of the printing process;

determining a weighting for the received metrics;

applying the determined weighting to each of the vertices of a precomputed color separation model to create a new color separation model, the precomputed color separation model comprising a separation hypercube, wherein each axis of the separation hypercube representing a metric of a printing process, including the received at least one metric, and each vertex of the separation hypercube at each end of each axis representing the optimized separation of each metric, the color separation model precomputed offline prior to performing the printing process;

deriving a mapping from a first color space to a second color space based on the created new color separation model;

applying the mapping to each pixel of an input image defined in a first color space to convert it into a second color space; and printing the converted input image, wherein determining the weighting and applying the determined weighting to create the new color separation model are performed online during the printing process.

8. The method of claim 7, wherein determining a weighting comprises:

determining a weighting vector for the metrics based on design constraints, user preferences and/or current device state feedback.

9. The method of claim 7, wherein applying the determined weighting comprises combining the metrics in a linear average.

10. A non-transitory computer readable storage medium comprising instructions stored thereon, that when executed, direct a processor to:

create a color separation model, the model comprising a separation hypercube, wherein each axis of the separation hypercube represent a metric of a printing process and each vertex of the separation hypercube at each end of each axis represent the optimized separation of each metric, the color separation model created offline prior to performing the printing process;

determine a weighting metric represented by the created color separation model;

apply the determined weighting to each of the vertices of the created color separation model to create a new color separation model;

perform a color separation using the new color separation model; and perform the printing process, wherein determining the weighting and applying the determined weighting to create the new color separation model are performed online during the printing process.

11. The medium of claim 10, wherein the metric is one of a plurality of metrics, and wherein the instructions to direct a processor to create a color separation model comprise instructions to, when executed, direct a processor to:

select a subset of the metrics defining a characteristic of the printing process; and calculate separation for each of the selected metrics to define each vertex of the color separation model.

12. The medium of claim 10, wherein the metric is a first metric, and wherein the instructions to direct a processor to apply the determined weighting comprise instructions to, when executed, direct a processor to:

combine the first metric and the second metric in a linear average.

13. The medium of claim 10, wherein the instructions to direct a processor to create a color separation model comprise instructions to, when executed, direct a processor to:

create the color separation model using Neugebauer Primary area coverages.

14. The medium of claim 10, wherein the instructions comprise instructions to comprise instructions to, when executed, direct a processor to:

implement a printing interface to perform a color separation process and a halftone process based on the new color separation model.

15. The medium of claim 14, wherein channels connecting the color separation process and the halftoning process communicate using aspects associated with Neugebauer Primary Area Coverage (NPac) as dictated by the new color separation model.

16. The medium of claim 15, wherein the NPacs utilize a set of equations to characterize a color printing system based upon halftoning techniques used to perform the halftoning process using the new color separation model.

17. The medium of claim 14, wherein the instructions to implement a printing interface comprise instructions to, when executed, direct a processor to:

change a space in which a color separation process and a halftoning process communicate to the new color separation model.

18. The medium of claim 10, wherein the instructions comprise instructions to, when executed, direct a processor to:

cause drops of each ink as specified at each halftone pixel based on a halftone process as dictated by the color separation process performed using the new color separation model.

* * * * *